US006718596B2

(12) United States Patent
Kohlstrand et al.

(10) Patent No.: US 6,718,596 B2
(45) Date of Patent: Apr. 13, 2004

(54) REVERSIBLE DOOR HINGE

(75) Inventors: Kelly Michael Kohlstrand, Wyandotte, MI (US); Todd Joseph DeSantis, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/064,249

(22) Filed: Jun. 25, 2002

(65) Prior Publication Data

US 2003/0233732 A1 Dec. 25, 2003

(51) Int. Cl.[7] ............................ E05D 11/06; B60J 5/00

(52) U.S. Cl. ............................ 16/374; 16/235; 16/254; 296/146.11

(58) Field of Search .......................... 16/374, 235, 254, 16/260, 363, DIG. 23; 296/146.11, 146.9

(56) References Cited

U.S. PATENT DOCUMENTS

| | | | | | |
|---|---|---|---|---|---|
| 563,133 | A | | 6/1896 | Cabaret | |
| 4,766,643 | A | * | 8/1988 | Salazar | 16/222 |
| 4,794,669 | A | * | 1/1989 | Sanders | 16/341 |
| 5,093,960 | A | | 3/1992 | Pemberton | |
| 5,272,789 | A | | 12/1993 | Mitchell et al. | |
| 5,361,455 | A | * | 11/1994 | Kiefer | 16/235 |
| 5,570,498 | A | | 11/1996 | Hipkiss et al. | |
| 5,577,295 | A | * | 11/1996 | Papke et al. | 16/254 |
| 5,791,018 | A | * | 8/1998 | Yoshinobu | 16/374 |
| 5,926,917 | A | * | 7/1999 | Gantz | 16/334 |
| 6,108,866 | A | | 8/2000 | Waynick, Jr. | |
| 6,178,593 | B1 | * | 1/2001 | Carlson | 16/82 |
| 6,332,243 | B1 | * | 12/2001 | Kim | 16/334 |
| 6,427,287 | B1 | * | 8/2002 | Brueckner et al. | 16/342 |

FOREIGN PATENT DOCUMENTS

| | | | | |
|---|---|---|---|---|
| DE | 3128068 A1 | * | 2/1983 | E05D/11/06 |

* cited by examiner

*Primary Examiner*—Lynne H. Browne
*Assistant Examiner*—Christopher Boswell
(74) *Attorney, Agent, or Firm*—Gigette M. Bejin

(57) ABSTRACT

The vehicular door hinge of the present invention facilitates both forward and rearward swinging door motion. The present invention achieves this objective by reversing the orientation of the door component portion of the hinge within the body component portion of the hinge. An integrated door stop is incorporated into the body component. The integrated door stop further includes non-parallel stop surfaces that abut the door component's geometry in both the conventional and reversed configurations to give the desired opening angles. As a result, the present invention allows for different uses from the same components where a first predetermined angle may be achieved or a second predetermined angle may be achieved with different swing directions.

10 Claims, 6 Drawing Sheets

REVERSIBLE DOOR HINGE

BACKGROUND OF INVENTION

1. Field of Invention

This invention applies to hinges and in particular reversible door hinges for vehicles.

2. Background of the Invention

Trucks and other vehicles may include a variety of doors such as tailgates, driver's side doors, passenger side doors, third door, etc. In many cases, the angle at which the door may be opened away from the vehicle varies depending upon the type of opening. For example, a rearward swinging door or a third/fourth door on a pickup truck may open approximately 90 degrees to allow for the appropriate ingress and egress for the vehicle. With respect to a forward swinging passenger door, the door may open approximately 65 degrees.

U.S. Pat. No. 5,570,498 issued to Hipkiss et. al. discloses a lift-off type vehicle hinge and bracket with a stop formed integrally with the bracket. The stop of the '498 patent operates to prevent the door from opening beyond a predetermined angle.

U.S. Pat. No. 6,108,866 issued to Waynick discloses a detent mechanism for a vehicle door for selectively maintaining a vehicle door in an open position at a predetermined angle. The detent mechanism is mounted to the door hinge by engaging the detent mechanism to the hinge pin of the door hinge. The detent mechanism includes a planar side surface which contacts both the stationary and pivotal components of the door hinge. The planar side surface contacts the stationary and pivotal components by a sufficient door closing effort. Accordingly, the invention disclosed in the '866 patent allows a door to be opened at two different angles such that the door can be opened to a greater degree by applying sufficient door closing efforts.

However, the prior art does not allow the same hinge design to be used for two different types of doors such as, but not limited to, a standard forward swinging passenger door and a rearward swinging rear door for a pickup truck. Rather, the prior art generally requires different hinges for different openings to be tooled differently for each type of door opening. As a result, increased costs are incurred.

Consequently, a need has developed for a low-cost versatile door hinge which may be used for different types of door openings requiring different opening angles and swing directions.

SUMMARY OF INVENTION

This invention is a door hinge which includes a stamped, open section body component which is configured to accept a reversible stamped door component wherein the stamped door component may be used in two different orientations relative to the body component to allow for two different full open door angles and swing directions. This assembly is designed to facilitate a conventional forward swinging door arrangement including a compatible full open stop configured at a first predetermined angle in one assembly configuration and a rearward swinging door arrangement including a compatible full open stop configured at a second predetermined angle in a second assembly configuration.

The hinge of the present invention facilitates both the forward and rearward swinging door motion envelopes. The present invention achieves this objective by reversing the orientation of the door component of the hinge assembly relative to the body component of the hinge assembly. An integrated full open door stop is incorporated into the body component. The integrated full open door stop further includes non-parallel stop surfaces that abut the door component's geometry in both the conventional and reversed configurations to give the desired opening angles. As a result, the present invention allows for different uses from the same components where a first predetermined full open angle may be achieved or a second predetermined full open angle may be achieved with different swing directions. Accordingly, there is significant tool cost savings, reduced piece cost, lower assembly capital and labor required.

DETAILED DESCRIPTION

Figure 1:
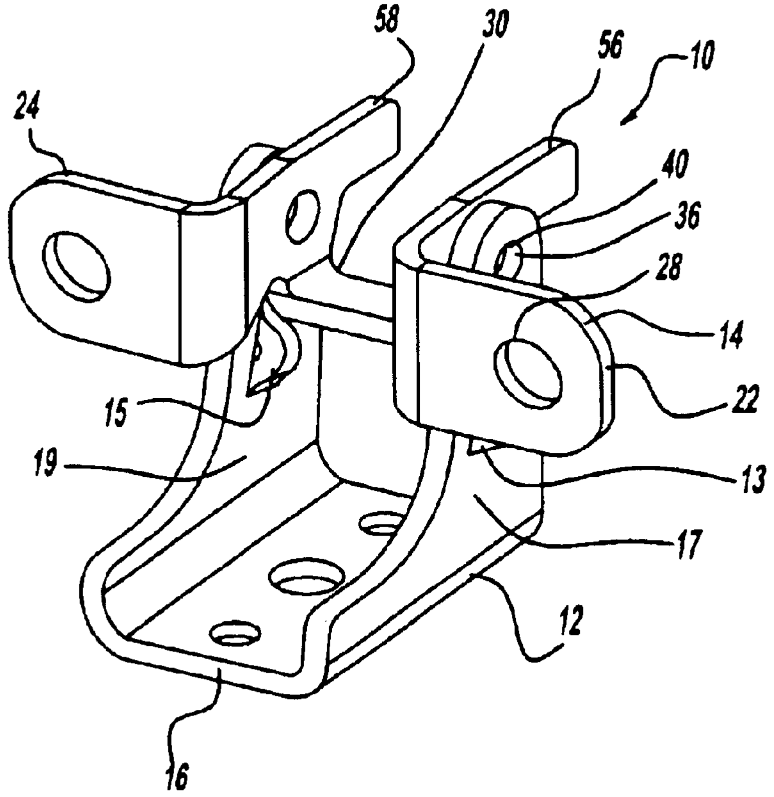
FIG. 1 is an isometric view of the reversible hinge assembly of the present invention with the door component in a first orientation.

FIG. 1 illustrates the door hinge assembly of the present invention. The door hinge assembly is made up of two major components: the body component 12 which is stationary and fixed to the vehicle and the door component 14 which is pivotal. The body component 12 includes a coupling plate 16 which is adapted for attachment to a vehicle body vi welding bonding, riveting bolting or similar means (shown in FIGS. 2 and 3). The body component also includes structural projections 17, 19 that extend outboard of coupling plate 16. The structural projections 17, 19 preferably include integrated door stops 13, 15 that are formed on the inner portions of the structural projections 17, 19. The structural projection 17 also includes a pivot hole 40 arranged in alignment with a pivot hole (not visible in FIG. 1) in structural projection 19 wherein the pivot holes are both adapted to receive a hinge pin.

Figure 7:
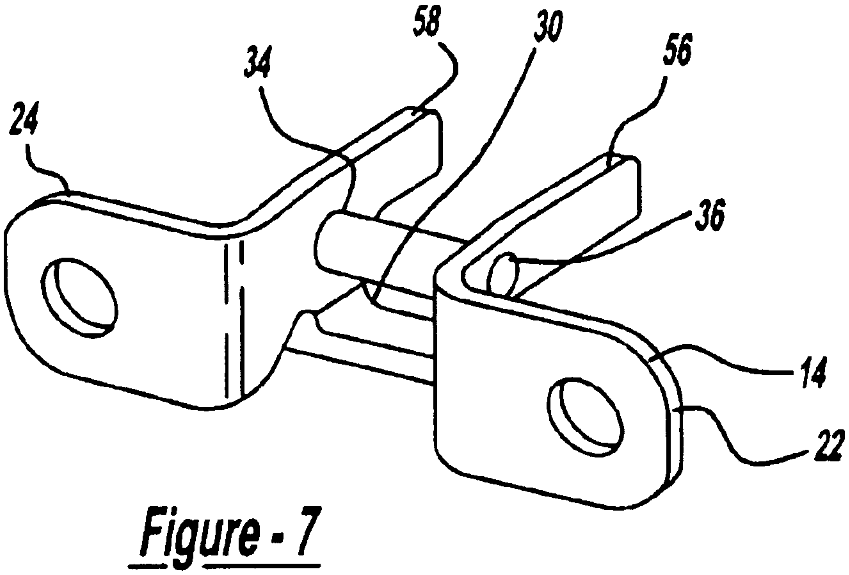
FIG. 7 is an isometric view of the door component of the reversible hinge assembly of the present invention.
Figure 8:
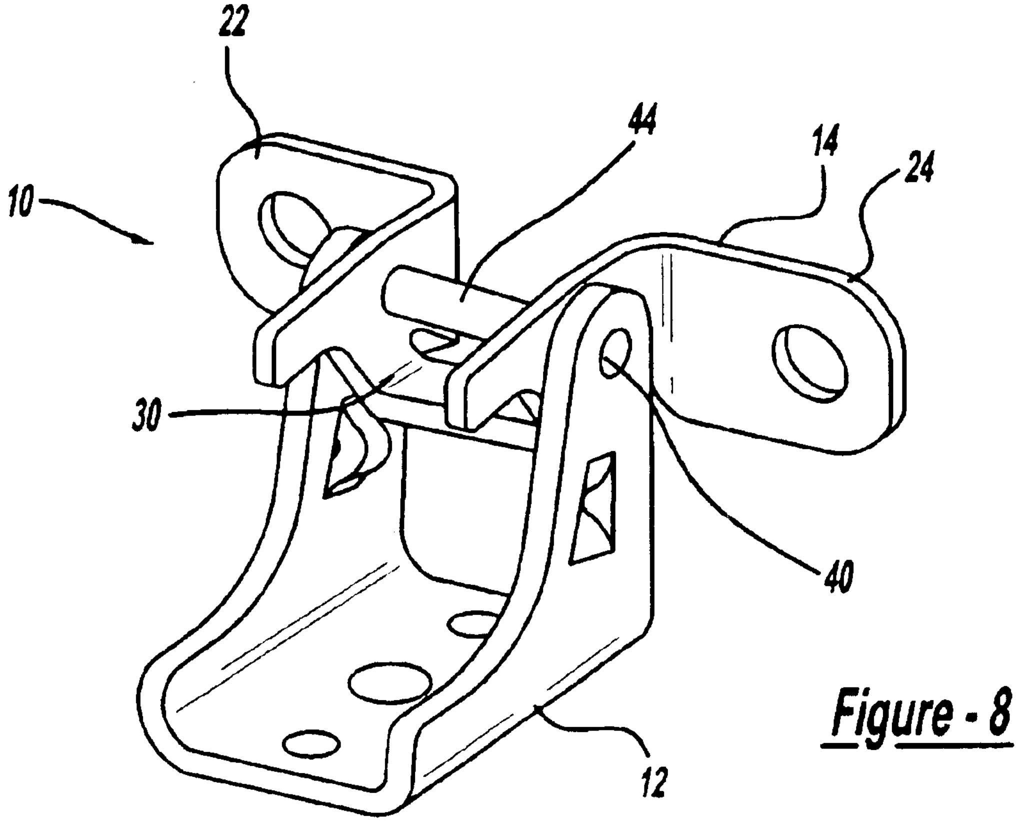
FIG. 8 is an isometric view of the reversible hinge assembly of the present invention with the door component in a second orientation and the hinge pin installed.

As illustrated in FIG. 1, a door component 14 is also included as part of the door hinge assembly 10. The door component 14 is provided with two base formations 22, 24 which are adapted for attachment to a vehicle body via welding, bonding, riveting, bolting or similar means (shown in FIGS. 2 and 3). A horse shoe formation 30 connects the two base formations 22, 24 together. The horse shoe formation of the door component 14 has a width that is less than the body component 12. The door component 14 includes two horizontally extending legs 56, 58 and two aligned holes 34, 36 for receiving the hinge pin 36 (shown in FIG. 7). The two holes 34, 36 of the door component are aligned with holes 40 in the body component 12 so as to receive a hinge pin 44 (illustrated in FIG. 8).

Figure 2:
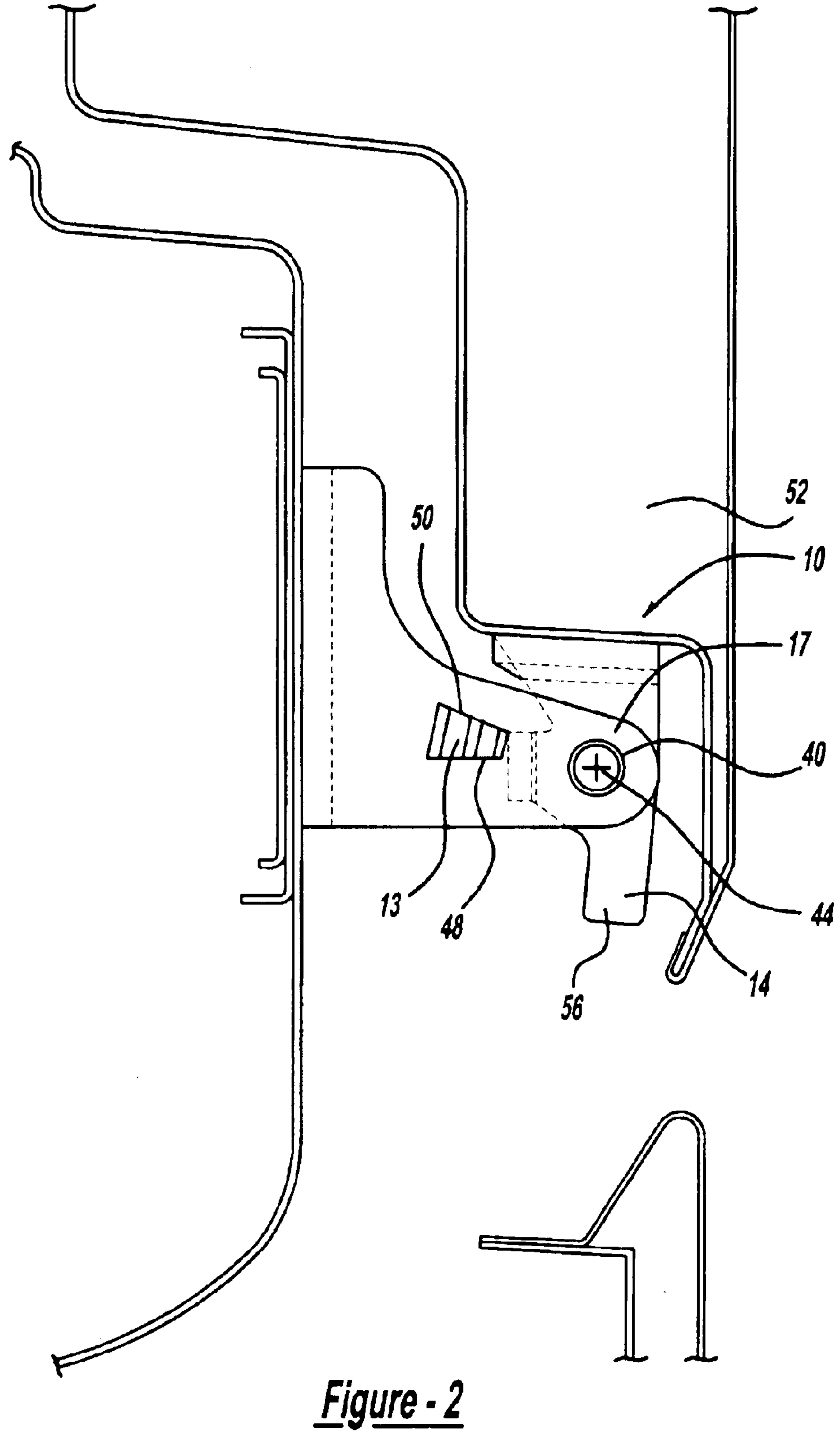
FIG. 2 is a plan view of the reversible hinge assembly installed in a vehicle with the hinge assembly installed for a first predetermined opening angle with the door component in a first orientation.

FIG. 2 illustrates a plan view of the hinge assembly 10 installed in a vehicle with the door component 14 in a first orientation to facilitate reward swing of the door. The hinge pin 44 extends through holes 34, 36 (34 shown in FIG. 1; 36 shown in FIG. 7) of door component 14 and holes 40, 41 (41 not shown in FIG. 2) of structural projections 17, 19 (19 not shown in FIG. 2) of the body component 12. As can be understood by the views in FIGS. 2 and 3, the first integrated door stop 13 of the body component 12 includes two non-parallel surfaces 48, 50. The second integrated door stop 15 (shown in FIG. 1) of the body component 12 also has non-parallel surfaces which are identical to the first integrated door stop 13.

Figure 3:
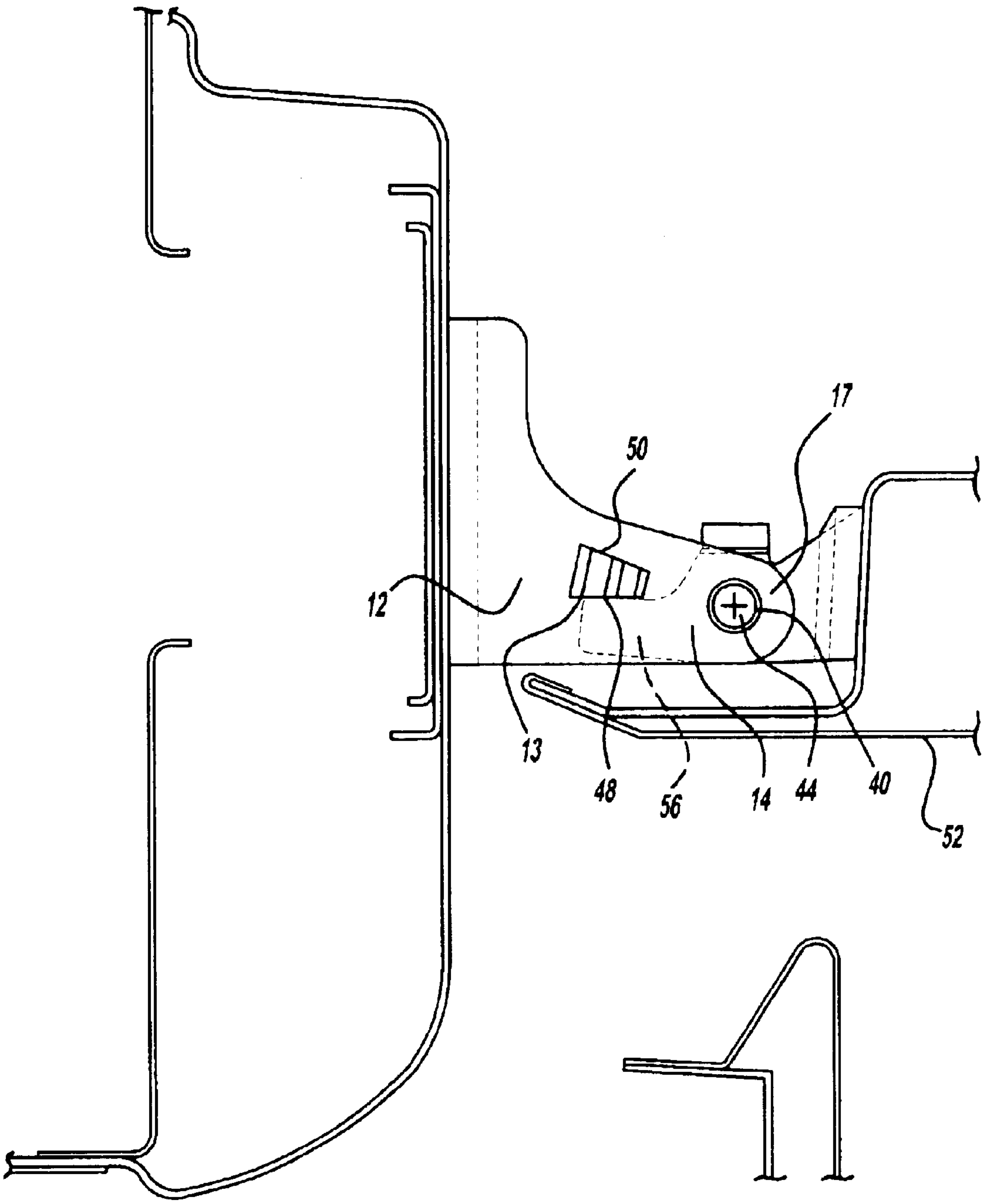
FIG. 3 is a plan view of the reversible hinge assembly installed in a vehicle with the door opened to a first predetermined opening angle with the door component in the first orientation.

The door component 14 is mounted about hinge pin 44 and is adapted to provide a means to pivot door 52 from a closed position as seen in FIG. 2 to an open position as seen in FIG. 3 in a first rotational direction. The horizontally extending legs 56, 58 (58 shown in FIG. 1) of the door component 14 extend out and away from the hinge 10 when the door 52 is closed. When door 52 is completely open, the two horizontally extending legs 56, 58 (58 shown in FIG. 1) of the door component 14 abut against a first surface 48 of each of the integrated door stops 13, 15. As shown in FIG. 3, the integrated door stop 13 includes a surface 48 which allows the door 52, in a fully opened position, to be opened to a first predetermined maximum angle.

Figure 4:
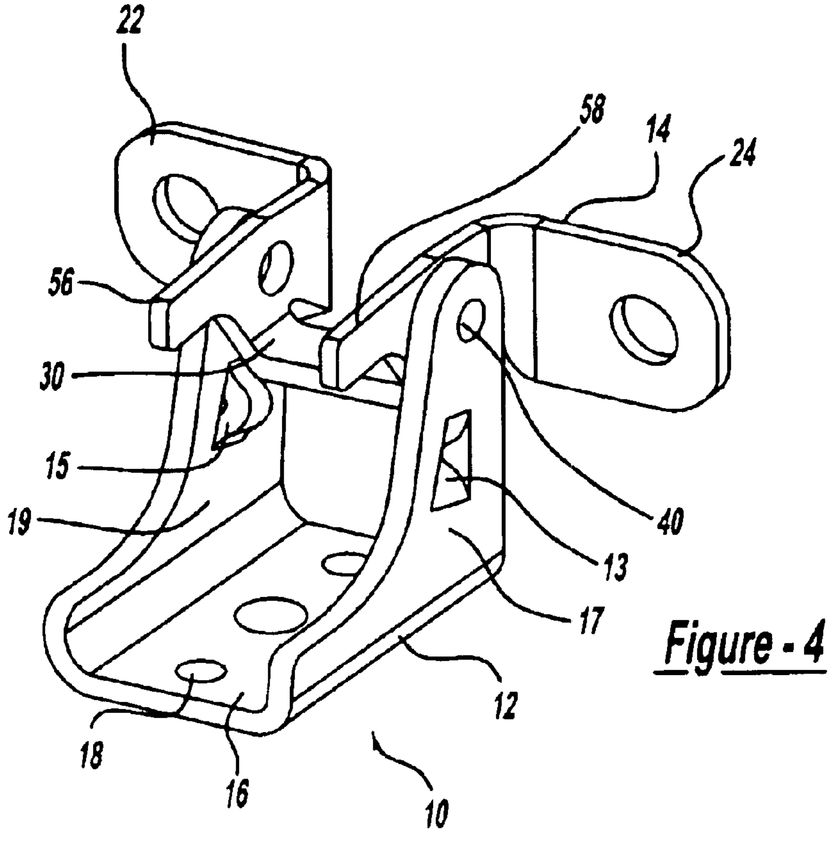
FIG. 4 is an isometric view of the reversible hinge assembly with the door component in a second orientation.
Figure 5:
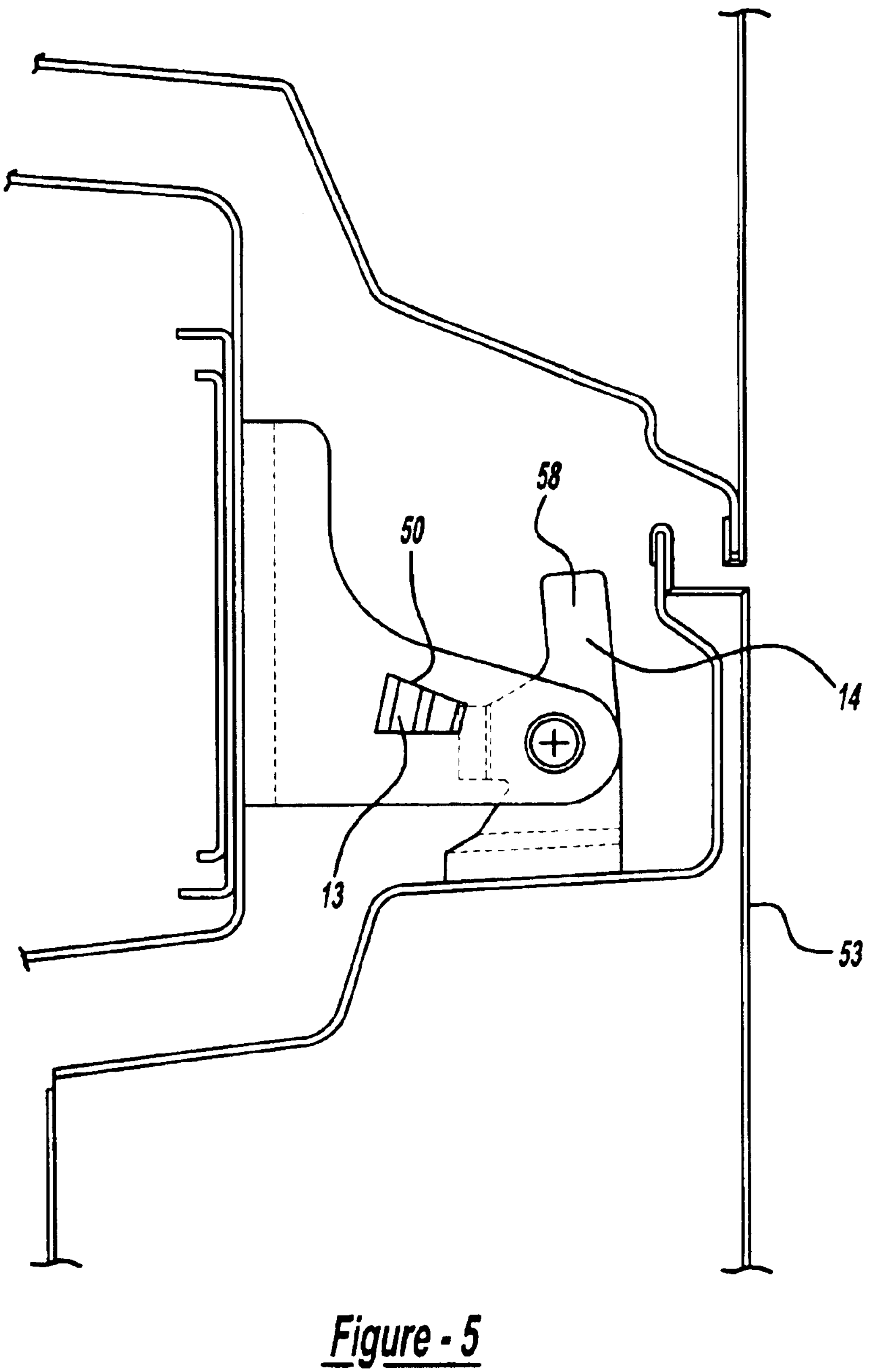
FIG. 5 is a plan view of the reversible hinge assembly installed in a vehicle with the hinge assembly installed for a second predetermined opening angle where the door component is in the second orientation.
Figure 6:
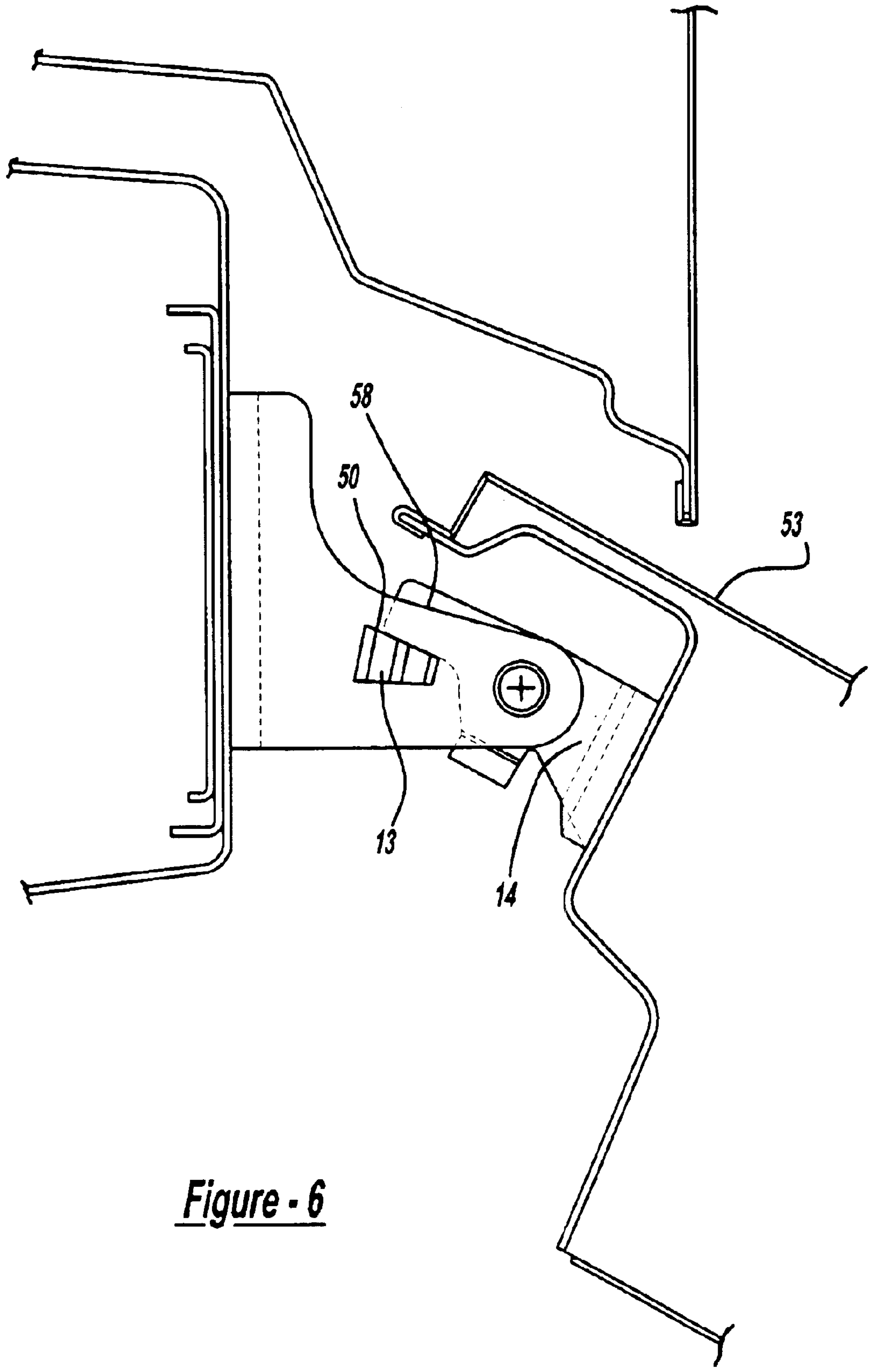
FIG. 6 is a plan view of the reversible hinge assembly installed in a vehicle with the door opened to a second predetermined opening angle where the door component is in a second orientation.

FIG. 4 illustrates the door component 14 seated in a reverse orientation to that shown in FIG. 1. In this orientation, the door component 14 is mounted about hinge pin 44 (shown in FIG. 8) and is adapted to provide a means to pivot door 53 from a closed position as seen in FIG. 5 to an open position as seen in FIG. 6 in a second rotational direction. The horizontally extending legs 56, 58 of the door component extend out and away from the hinge 10 when the door 53 is closed. When door 53 is completely open, the two horizontally extending legs 56, 58 of the door component abut against the second surface 50 of each of the integrated stops 13, 15. As shown in FIG. 6, the integrated door stop 13 includes a surface 50 which allows the door 53, in a fully opened position, to be opened to a second predetermined maximum angle.

Having described the hinge of the present invention, various advantages and uses will become apparent to those skilled in the art. Further, upon reading the foregoing description, it will be readily appreciated by those skilled in the art that modification may be made to the invention without departing from the concepts disclosed herein. Such modifications are considered as included in the following claims unless these claims by their language expressly state otherwise.

What is claimed is:

1. A reversible hinge assembly which may be used for two different types of door openings, the reversible hinge assembly comprising:

a body component attached to a vehicle body;

a door component attached to a vehicle door, the door component being adapted to be assembled in one of a first orientation onto said body component or a second orientation onto said body component; and a hinge pin pivotally connecting said body component and said door component, wherein said body component includes an integrated stop with two non-parallel surfaces such that one of the two non-parallel surfaces abuts with said door component to allow for a second pre-determined door opening angle when the door component is assembled in the second orientation.

2. The vehicle door hinge assembly defined in claim 1 wherein said body component incorporates a pair of structural projections and a coupling plate portion interconnecting there between, each of said structural projections having a hole formed therein for receiving said hinge pin and each of said structural projections having the integrated stop formed therein.

3. The vehicle door hinge assembly defined in claim 2 wherein the door component incorporates a pair of base formations, a horseshoe formation and a pair of horizontally extending legs, each of said horizontally extending legs having a hole formed therein for receiving said hinge pin and each of said horizontally extending legs having a surface adapted to abut against the non-parallel surfaces of the integrated stop formations of the body component.

4. The vehicle door hinge assembly defined in claim 3 wherein the hinge pin extends through the holes formed in structural projections of the body component and the holes formed in the horizontally extending legs of the door component so that free pivotal movement of the door component is permitted relative to the body component.

5. The vehicle door hinge assembly defined in claim 4 wherein the door component is adapted to be assembled within the body component in either of two different orientations such that in the first orientation the horizontally extending legs abut one of the two non-parallel surfaces of the integrated stop formations of the body component, and in the second orientation the horizontally extending legs abut the other of the two non-parallel surfaces of the integrated stop formations of the body component so that two different predetermined door opening angles can be achieved.

6. The vehicle door hinge assembly defined in claim 5 wherein the body component is manufactured as a metal stamping with the structural projections, the coupling plate portion and the hinge pin pivot holes all formed from a single flat blank and the integrated stops and associated two non-parallel surfaces created as semi-sheared formations.

7. The vehicle door hinge assembly defined in claim 5 wherein the door component is manufactured as a metal stamping with the pair of base formations, the horseshoe formation, the pair of horizontally extending legs and the hinge pin pivot holes all formed from a single flat blank.

8. A reversible hinge assembly which may be used for two different types of door openings, the reversible hinge assembly comprising:

a body component attached to a vehicle body and incorporating a pair of structural projections and a coupling plate portion interconnecting there between, each of said structural projections having a hole formed therein for receiving a hinge pin and each of said structural projections having formations adapted to function as integrated stops with two non-parallel surfaces;

a door component incorporating a pair of base formations, a horseshoe formation and a pair of horizontally extending legs, each of said horizontally extending legs having a hole formed therein for receiving said hinge pin and each of said horizontally extending legs having a surface adapted to abut against the non-parallel surfaces of the integrated stop formations of the body component;

a hinge pin extending through the holes formed in structural projections of the body component and the holes formed in the horizontally extending legs of the door component so that free pivotal movement of the door component is permitted relative to the body component, wherein the door component is adapted to be assembled onto the body component in either of two different orientations such that in the first orientation the horizontally extending legs abut one of the two non-parallel surfaces of the integrated stop formations of the body component, and in the second orientation the horizontally extending legs abut the other of the two non-parallel surfaces of the integrated stop formations of the body component so that two different predetermined door opening angles can be achieved.

9. The vehicle door hinge assembly defined in claim 8 wherein the body component is manufactured as a metal stamping with the structural projections, the coupling plate portion and the hinge pin pivot holes all formed from a single flat blank and the integrated stops and associated two non-parallel surfaces created as semi-sheared formations.

10. The vehicle door hinge assembly defined in claim 8 wherein the door component is manufactured as a metal stamping with the pair of base formations, the horseshoe formation, the pair of horizontally extending legs and the hinge pin pivot holes all formed from a single flat blank.

* * * * *